US012775913B2

(12) United States Patent
Andronis Murphy et al.

(10) Patent No.: US 12,775,913 B2
(45) Date of Patent: Oct. 27, 2026

(54) SYSTEM AND METHOD FOR SENSOR-BASED IMPROVED BUILDING USAGE

(71) Applicant: Wells Fargo Bank, N.A., San Francisco, CA (US)

(72) Inventors: Pamela Marie Andronis Murphy, Walnut Creek, CA (US); Azita Asefi, Vacaville, CA (US); Nathan Craig Bricklin, Walnut Creek, CA (US); Nathan B. Coles, El Cerrito, CA (US); Kevin Anthony King, Concord, CA (US); Dennis E. Montenegro, Concord, CA (US); Stanislav V. Roumiantsev, Albany, CA (US); Darrell Lee Suen, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 190 days.

(21) Appl. No.: 18/543,398

(22) Filed: Dec. 18, 2023

(65) Prior Publication Data

US 2025/0200514 A1 Jun. 19, 2025

(51) Int. Cl.
*G06Q 10/10* (2023.01)
*G06Q 90/00* (2006.01)

(52) U.S. Cl.
CPC ............. *G06Q 10/10* (2013.01); *G06Q 90/20* (2013.01)

(58) Field of Classification Search
CPC ............................... G06Q 10/10; G06Q 90/20
USPC ........................................................... 705/1.1
See application file for complete search history.

(56) References Cited

U.S. PATENT DOCUMENTS

| | | | |
|---|---|---|---|
| 9,600,781 | B2 | 3/2017 | Zamer |
| 10,388,096 | B2 | 8/2019 | Bruce et al. |
| 11,392,863 | B2 | 7/2022 | Vashisht et al. |
| 2009/0259498 | A1 | 10/2009 | Halavais et al. |
| 2014/0019172 | A1 | 1/2014 | Oxenham et al. |
| 2014/0195277 | A1 | 7/2014 | Kim |

(Continued)

OTHER PUBLICATIONS

"Occupancy Detection via Environmental Sensing" Published by IEEE (Year: 2018).*

(Continued)

*Primary Examiner* — Zeina Elchanti
(74) *Attorney, Agent, or Firm* — SCHWEGMAN LUNDBERG & WOESSNER, P.A.

(57) ABSTRACT

Aspects of the present disclosure include techniques for building utilization. In one example, a method includes receiving, via one or more sensors, a first sensor data indicating a work area of a first individual within a building, and receiving, via the via the one or more sensors, a second sensor data indicating a second individual entering the building. The method additionally include accessing stored data from a data store indicating the existence of a team affiliation between the first individual and the second individual, and calculating a cluster area encompassing the work area of the first individual. The method also includes assigning a second work area to the second individual, wherein second work area is disposed within the cluster area, continually monitoring, via the one or more sensors, a plurality of locations for a plurality of individuals entering the building, and assigning work areas to the plurality of the individuals.

20 Claims, 4 Drawing Sheets

(56) References Cited

U.S. PATENT DOCUMENTS

| | | | | |
|---|---|---|---|---|
| 2015/0022093 | A1* | 1/2015 | Smith | A61N 5/0618 315/307 |
| 2015/0227969 | A1 | 8/2015 | Hanly | |
| 2015/0348121 | A1 | 12/2015 | Lee et al. | |
| 2017/0131688 | A1* | 5/2017 | Cheung | G06F 21/31 |
| 2017/0293866 | A1 | 10/2017 | Bender et al. | |
| 2017/0364817 | A1* | 12/2017 | Raykov | G06N 20/10 |
| 2017/0364835 | A1 | 12/2017 | Baker et al. | |
| 2018/0174076 | A1 | 6/2018 | Fukami | |
| 2022/0309465 | A1 | 9/2022 | Scheidegger et al. | |
| 2023/0012149 | A1 | 1/2023 | Ohga et al. | |
| 2025/0138497 | A1* | 5/2025 | O'Leary | G05B 15/02 |

OTHER PUBLICATIONS

"Simple desk booking software for hybrid workplaces", [Online]. Retrieved from the Internet: URL: https: kadence.codesk-booking-software , (accessed on Jun. 5, 2023), 8 pgs.

"Why Workflo?", [Online]. Retrieved from the Internet: URL: https: www.workflobyoyo.com , (accessed on Aug. 5, 2020), 14 pgs.

* cited by examiner

SYSTEM AND METHOD FOR SENSOR-BASED IMPROVED BUILDING USAGE

TECHNICAL FIELD

The present disclosure generally relates to buildings, and more specifically to work performed in buildings.

BACKGROUND

Buildings provide for hybrid workplaces for office workers to engage in a variety of tasks. For example, office workplaces enable building-based locations for financial workers to services to various clientele. The buildings provide for office space, communication services, conference spaces, and so on.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document. Various ones of the appended drawings merely illustrate example embodiments of the present inventive subject matter and cannot be considered as limiting its scope.

DETAILED DESCRIPTION

Figure 1:
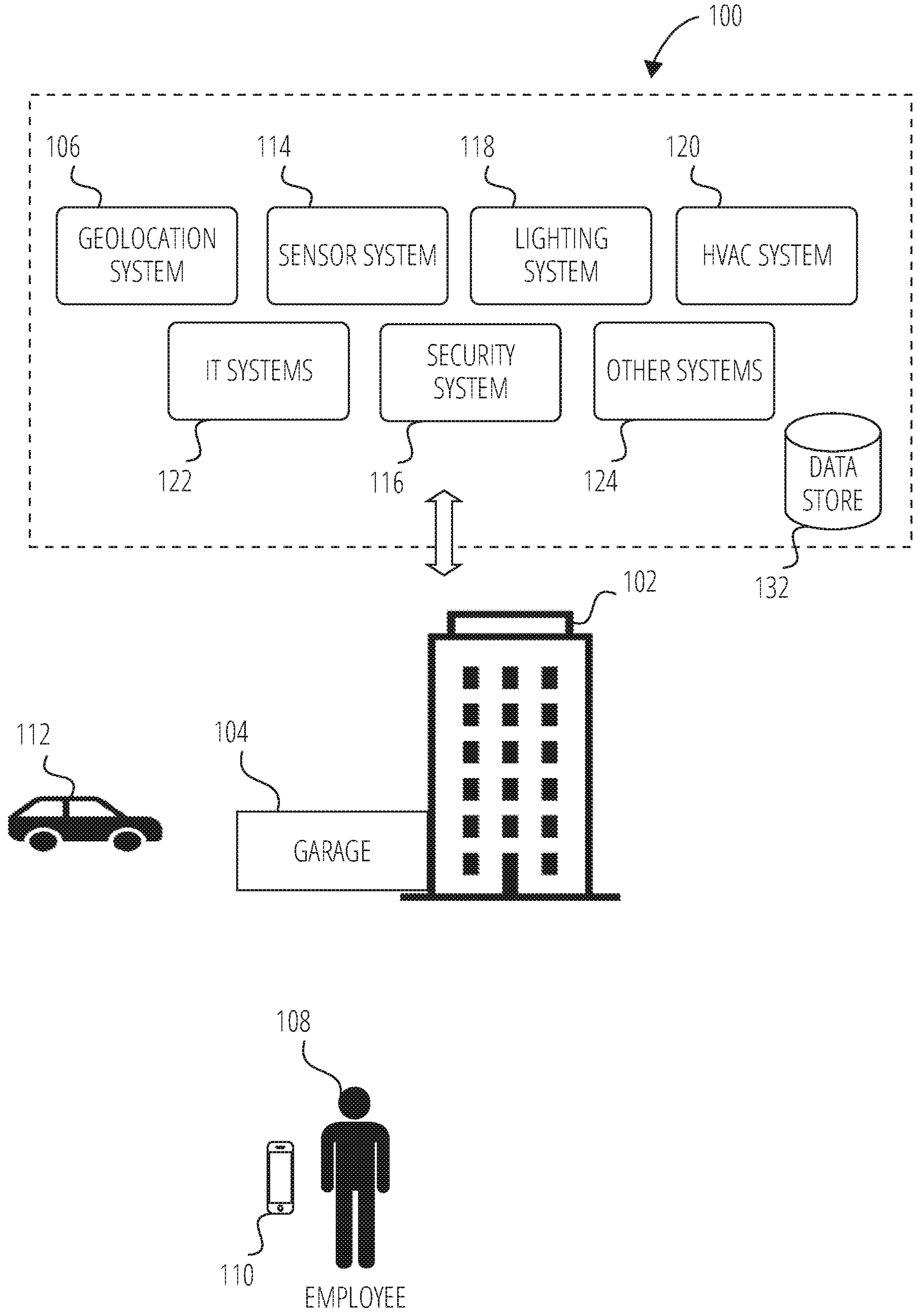
FIG. 1 illustrates a block diagram of a building utilization system suitable for dynamically clustering coworkers and for enhancing building resource utilization, according to certain examples.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The techniques described herein solve various technical problems such as dynamically clustering a group of coworkers in a building (e.g., smart building) to provide for more efficient utilization of building resources, such as lights, temperature control, office spaces, information technology (IT) resources, and the like. Traditionally this has been done through fixed architectural plans and employee schedules. However, as hybrid work models become more common, there is increased unpredictability in who will be in the office and when.

In one example, a building utilization system uses location sensing and occupant identity data to dynamically group individuals, control access, and better optimize building resources in real time based on occupancy. The techniques described herein provide for enhanced employee collaboration and security while also using building resources such as lighting and HVAC more efficiently. The building utilization techniques described herein include using a variety of sensors, including location sensors, to identify the location and the identity of individuals within various areas of a building. Sensors include biometric sensors, global positioning system (GPS) sensors, WiFi signal sensors, Bluetooth beacons, cameras, infrared sensors, ultrawide band (UWB) sensors, radio frequency ID (RFID) readers, and the like.

Individual occupant identity is determined via biometrics, via badges, and/or via mobile devices. Stored access rights define which areas each individual may access. A building utilization system uses the location and identity data to dynamically assign individuals to work areas and/or clusters (e.g., groupings of work areas). Work area and/or cluster assignments are based on team membership, roles, scheduled activities, etc. Individuals are then restricted or granted access to work areas based their stored access rights. In addition, environmental building conditions (e.g., temperature, humidity, lighting levels, and the like), and building resources are optimized based on monitored occupant activity.

Notifications and wayfinding aids may also be provided to help individuals navigate to their assigned areas, such as areas assigned dynamically via a building utilization system further described below. Assigned areas include offices (e.g., an assigned office) as well as open seating areas (e.g., assigned group of offices, assigned group of cubicles, conference room areas, and so on). Occupancy and building resource usage data is logged to inform future space planning and to improve on electric power usage. Accordingly, the techniques described herein improve on building resource usage, provide enhanced security, enable collaboration, and assist building navigation based on real-time location and occupancy data.

Turning now to FIG. 1, the figure is a block diagram of a building utilization system 100 suitable for dynamically clustering coworkers and for enhancing building resource utilization, according to certain examples. In the depicted example, a building 102 is shown, with a garage 104. The building utilization system 100 includes various systems that are disposed in the building 102 and/or in the garage 104, such as a geolocation system 106. The geolocation system 106 includes wide (e.g., 20 miles or more), medium (1 mile or less) and narrow (e.g., microlocation at a foot or less) geolocation to track people entering and moving within the building 102 and/or the garage 104. This includes using GPS, Bluetooth beacons, Ultra Wide Band sensors, WiFi (e.g., WiFi used for tracking individuals), and other positional and/or tracking technologies, to determine locations of employees 108 and/or mobile devices 110 that could be carried by the employees 108.

In one example, the employee 108 alerts the building utilization system 100 that the employee 108 is headed to work in the building 102, for example, via an application executable by the mobile device 110. For example, the employee 108 enters authentication information and selects certain working dates when the employee 108 will be in the building 102. The mobile device 110 then provides geolocation information as the employee 108 heads towards the building 102, verifying that the employee 108 is headed to the building 102. When driving, the employee's vehicle 112 may then have a parking spot automatically reserved in the garage 104. For example, a sensor system 114 may include certain sensors, such as cameras and inductive sensors that detect the presence of various vehicles in the garage 104. The building utilization system 100 then uses the sensor information to detect open parking stops and assigns a parking spot to the employee 108.

The building utilization system 100 stores certain information, such as employee information, in a data store 132. The employee information includes membership in certain teams, e.g., sales team, engineering team, IT support, and so on. Additionally, the employee information includes a typical time and/or day of the week for the employee 108 to enter and to exit the building 102. In some examples, the parking spot is assigned as part of a cluster of neighboring parking spots based on the typical times that the employees in the parking cluster enter and exit the parking garage 104.

In certain examples, the building utilization system 100 assigns a work area inside of the building 102, such as an office, to the individual based on data stored in the data store 132 indicating membership of the individual in one or more teams. For example, team members are assigned a cluster of neighboring offices when the team members are going to work in the building 102 during the same workday. The work area assignment (and cluster selection) also takes into account building resource usage optimization. For example, during winter, a certain side of the building 102 may be warmer due to sun exposure. Accordingly, the building utilization system 100 will take into account time of year, expected weather (e.g., via a weather prediction provided by a weather forecasting source), building sun exposure, and the like, in addition to team membership, when assigning work areas in order to minimize electrical power usage.

In one example, a group of individuals that are members of a team are located near each other. Team members notice each other upon arrival and then "organically" tend to sit near each other. For example, when 3 team members have already sat near each other, the building utilization system 100 notices that team members have already chosen locations near each other, and uses the locations as a basis for defining the cluster. The system then guides the 4th to Nth team members to go to that cluster. The cluster thus grows in place.

As the employee 108 enters the building 102, tracking sensors in the geolocation system 106 detect the entry of the employee 108. A security system 116 is used to enable the identification of the employee 108 and to open and/or close certain doors based on access granted to the employee 108. In some examples, biometric techniques, such as facial identification, voice identification, retinal identification, fingerprint identification, and/or electroencephalogram-based identification are used to authenticate and identify the employee 108.

The building utilization system 100 will monitor, via sensors, the employee's location along a designated route to the assigned work area, and provide notifications to the employee 108 to guide them along the designated route. As the employee 108 moves on the designated route, lighting ahead of them along the designated route is activated to provide a well-lit route and aid wayfinding. Lighting can also be color changed and/or blinked to provide clues of where to go next. Electronic door locks along the designated route are dynamically controlled to only allow access to authorized areas based on the individual's identity and assigned access rights. For enhanced security, individuals may be dynamically assigned to groups as they cluster in different areas. Access to the clusters can then be restricted to members of the cluster only. This allows for ad-hoc security zones to be established based on real-time occupancy patterns. Notifications may be provided if an individual attempts to access an unauthorized area. Activity logging allows auditing of access control and detection of potential intrusions.

Lights included in a lighting system 118 are dimmed or turned off behind them as the user progresses through the designated route. The lighting system 118 includes controllable light fixtures throughout the building. These may include LED fixtures capable of dimming and color tuning. The lighting system 118 further optimizes lighting usage based on real-time occupancy patterns. Occupancy sensors included in the sensor system 114 detect the presence and location of individuals in each area. This is used to activate lighting only in occupied areas. Lights are dimmed or turned off in unoccupied areas to conserve energy. In addition, the lighting system 118 can implement circadian lighting schedules to support occupant health. This adjusts color temperature and intensity throughout the day to match natural light patterns.

When individuals are clustered in teams, the lighting system 118 can tune the lighting to match the group's preferences and/or to better suit the type of work being performed. For focused work, brighter "cool" lighting may be provided. For creative sessions, softer "warm" lighting may be activated. Occupancy patterns are logged over time and analyzed by statistical techniques and/or machine learning algorithms to continuously optimize lighting control logic for efficiency and user comfort. In this manner, the lighting system 118 provides dynamic, personalized lighting optimized for occupant needs, energy efficiency, and aesthetics.

A heating, ventilation and air conditioning (HVAC) system 120 further optimizes heating, ventilation, and air conditioning based on real-time occupancy patterns. The HVAC system 120 includes air handlers, chillers, pumps, vents, and other equipment to condition air temperature, humidity, and flow rates. The HVAC system 120 controls these components based on the number and location of occupants detected by sensors in the sensor system 114. In areas with high occupancy, air flow is increased, and temperature is controlled to occupant comfort setpoints. Unoccupied areas may be allowed to drift to wider setpoint ranges to conserve energy.

As people move through the building, HVAC is preconditioned along their anticipated path to provide comfort. HVAC usage is reduced in areas that they have vacated. Total building 102 occupancy is analyzed to better optimize start/stop times and economizer power modes. In low occupancy periods, HVAC operation may be minimized or shut down in unused areas. Ventilation rates are modulated based on density of occupancy to maintain air quality. The HVAC system 120 may be turned off to maximize fresh air intake when outdoor conditions permit free cooling. Statistical and/or machine learning algorithms analyze occupancy patterns over time to develop personalized comfort models and to tune HVAC control sequences for efficiency. In this manner, the HVAC system 120 provides for more optimized comfort, air quality, and energy conservation based on real-time occupancy data.

Information technology (IT) systems 122 are also included in the building utilization system 100. IT systems 122 maintain access control lists indicating which building areas the individual is authorized to access. Access rights may be defined based on an employee's team, the employee's role, the employee's security clearance, scheduled activities, etc. In addition, IT systems 122 maintain user preference profiles. This includes preferences for lighting, temperature, privacy, parking spots, desk locations, etc. As individuals move through the building, the IT systems 122 interface with other systems, e.g., lighting system 118 and HVAC system 120, to control experiences to match their preferences, while still optimizing overall resources. The IT systems 122 also interface with the geolocation system 106, the sensor system 114, and the security system 116 to collaborate in authenticating the employees 108, and to provide an ongoing identification and authentication of the employees 108 while employees are in the building 102 and garage 104. Indeed, in certain examples, employee badges are not used.

IT systems also interface with equipment such as laptops, phones, printers, audio/video (AV) systems to load appropriate software, configurations, settings, and credentials based on identity. User activity, customizations, and other events are logged by the IT systems 122 to inform access controls and preference models. Statistical and/or machine learning algorithms analyze the aggregated data to provide for improved personalization and security. In this manner, the IT systems 122 help identify users, provide access rights, and support user preferences to drive personalized, secure experiences while working in the building 102.

Other systems 124 include, for example, speakers disposed at various locations and used to implement a "cone of silence" around sensitive conversations by activating sound masking systems near a group's location. This prevents eavesdropping by those without authorization. Other systems 124 additionally include providers of snacks and beverages, including vending machines and robotic delivery systems. Other systems 124 further include health improvement systems, such as systems that reminds an employee 108 to stand after a certain amount of time, to take a break, to talk a short walk, to engage in breathing exercises, and so on.

Figure 2:
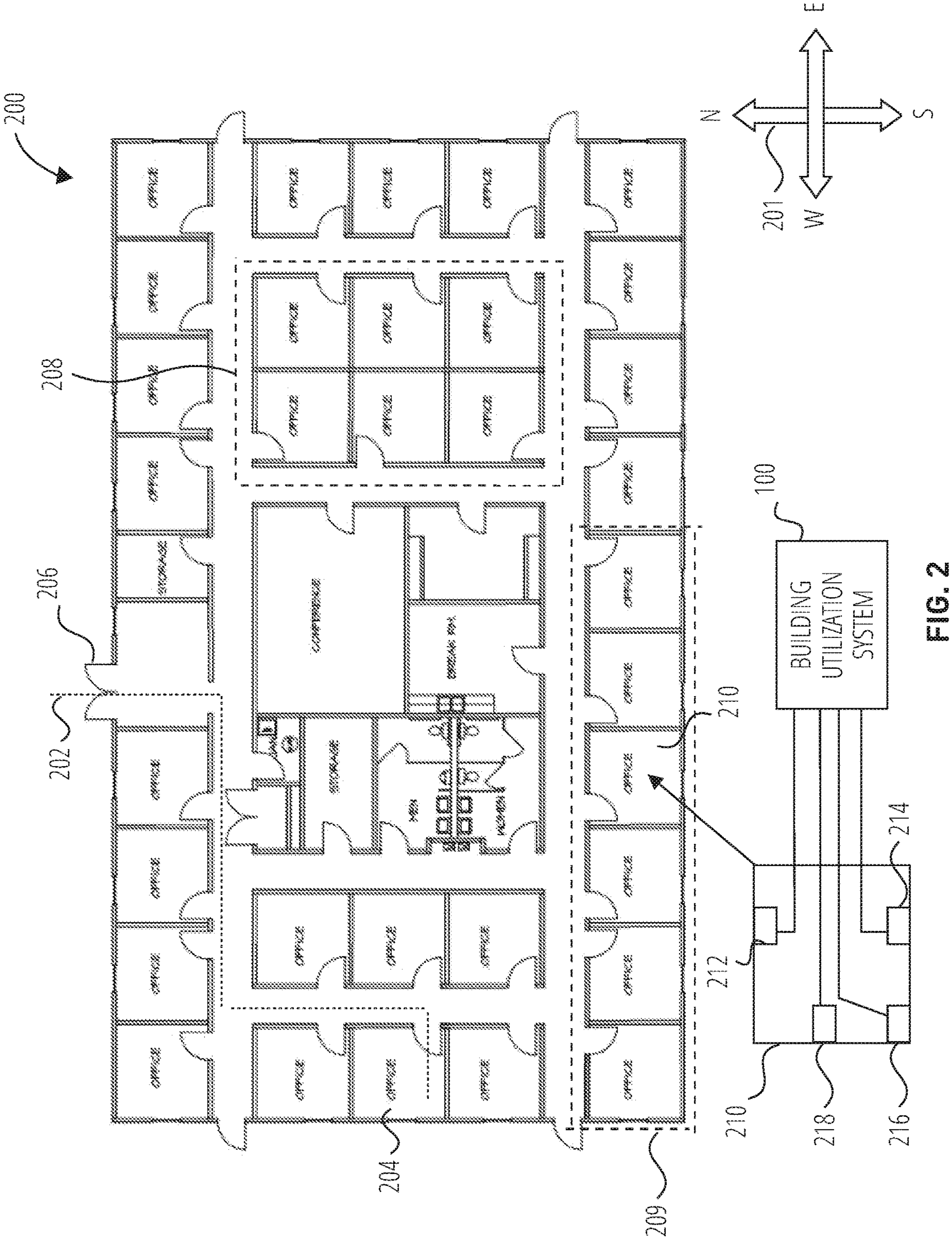
FIG. 2 illustrates a floor plan of a floor disposed in the building of FIG. 1, according to certain examples.

FIG. 2 illustrates a floor plan 200 of a floor disposed in the building 102, according to certain examples. In the depicted example, a compass rose 201 is also illustrated, representative of compass directions. As mentioned earlier, when an individual, such as the employee 108 approaches the building 102, the geolocation system 106 detects their presence and identity via certain techniques, such as biometric scans. The building utilization system 100 assigns the employee a work area for the day, which may include a desk, an office, a conference room, and so on. The building utilization system 100 then provides a guided route 202 that helps the employee 108 navigate to their work area, such as an office 204.

Guidance is provided via lighting, e.g., hallway lights, which come on as the employee 108 enters an area. For example, lighting along the guided route 202 is activated to provide a well-lit route and aid wayfinding. As the employee 108 walks the guided route 202 towards the office 204, lights are dimmed or turned off behind them. Doors are unlocked and locked as the employee 108 passes through. For example, door 206 is unlocked as the employee enters the building 102 and locked once the employee 108 is inside. Audio announcements, such as "you are headed towards office 57, turn left at the corridor" may also be provided. Electronic door locks are dynamically controlled to only allow access to authorized areas based on the employee's identity and assigned access rights. Navigation guidance through the building 102 can also be provided via a mobile application, via badges that use voice guidance, and so on. If the employee 108 needs to shift locations, new navigation guidance is provided, for example, by deriving another guided route. Sensors continue to track the employee 108 via the new guided route and update conditions (e.g., environmental conditions) in each area as the employee 108 travels.

Once the employee 108 is in their assigned work area, e.g., office 204, the employee's preferences for lighting, room temperature, sound, and the like, are used to provide a user-customizable work environment. Likewise, IT systems 122 such as desktops, monitors, printers, and so on, present in the assigned work area, are customized according to user profiles. The user profiles include software that is loaded for use by the employee 108, arrangement of desktop icons, resolution for monitor displays, preferred email configuration, preferred web browser configuration, preferred conferencing software configuration, and so on. Accordingly, the employee 108 saves time by not having to manually customize the IT systems 122 in the assigned work area.

In some examples, the assignment of the work area is based on clustering. That is, when teammates are scheduled to be in the building 102 on the same day, the building utilization system 100 assigns the team to a common zone or cluster, such as cluster 208, based on their team membership, current location(s) of team members in the building 102, planned activities, building resource use, and past clustering behavior. For example, the building utilization system 100 determines, based on employee input (e.g., input stating that the employee is going to be in the office a certain day) as well as based on observed behavior (e.g., driving behavior, location of teammates in the building 102), how many offices are needed to host the team close or next to each other, such as N offices. The building utilization system 100 then uses occupancy data to determine locations of N unoccupied offices that are next or close to each other. For some buildings, there may be more than one cluster that has unoccupied N offices next to each other.

Team members notice each other upon arrival and then "organically" tend to sit near each other. For example, when 3 team members have already sat near each other, the building utilization system 100 notices that team members have already chosen locations near each other, and uses the locations as a basis for defining the cluster. The system then guides the 4th to Nth team members to go to that cluster. The cluster thus grows in place. If a group had clustered in area 209 yesterday and today, someone else arrived earlier and was routed to area 208, in some examples, the building utilization system 100 then clusters to area 208 when someone from the original group arrives. Individuals can also opt out of clustering, and then opt in at a later time or date.

Alternate location clustering is also provided. For example, of an individual is clustered with a team in building 102 on Monday but Thursday goes to another building, if others from the building 102 Monday cluster arrive at the second building on Thursday, in some examples, the original cluster in building 102 is remembered (or recommended) and the new arrivals are directed to the original cluster. In another example, a new cluster is created in the second building based on the first arriving teammate.

The cluster 208 is also selected based on building resource usage. For example, during the winter, an eastern side of the building 102 is preferred for clustering because the eastern side has more sun exposure and is thus warmer. Accordingly, the cluster 208 is selected when compared to another cluster 209 having six unoccupied offices because the cluster 208 of offices would use less heat and thus less electrical power.

Once selected for occupancy, the cluster 208 is further optimized for the team's needs. HVAC, lighting, and sound settings are tuned to their preferences. Relevant equipment (e.g., IT systems 122) and connections are automatically customized. In cases where an IT system is needed, such as a laptop, a request is made to add the laptop to the appropriate office to be used by the requestor employee. Access control policies are configured to restrict entry to the team's cluster 208 to authorized members only for information security. Notifications alert the team if anyone approaches or enters the area. As team members come and go, the cluster 208 is expanded, contracted, or relocated dynamically based on real-time occupancy patterns. The system learns over time when and where specific teams tend to cluster. This data informs future cluster assignments and recommendations.

The figure also illustrates certain sensors, lighting, and other systems that are provided in each office and hallway sections and included in building utilization system 100 or are operatively coupled to the building utilization system 100. For example, an office 210 includes sensors 212 used to detect presence of individuals, such as occupancy sensors. The sensors 212 also include motion sensors to track movement and location, temperature sensors to detect room temperature, humidity sensors to detect room humidity, noise/sound sensors to detect decibel levels, and/or light sensors to detect lumens. The sensors 212 also include biometric scanners and camera sensors suitable for detecting and identifying the employees 108. The sensors 212 are provided as part of the sensor system 114 and used by the building utilization system 100 to customize the user work area, for safety purposes (e.g., fire detection), as well as to provide guidance during a traverse of the guided route 202.

The office 210 also includes lighting 214, such as LED fixtures capable of being dimmed and color tuned by the building utilization system 100. The lighting 214 is customized by the building utilization system 100 according to user preference and/or certain modes, such as focused work or creative sessions mode. For focused work, brighter "cool" lighting may be provided. For creative sessions, softer "warm" lighting may be activated. The lighting 214 is provided as part of the lighting system 118.

The office 210 additionally includes certain actuators 216, such as HVAC vents, blind actuators, curtain actuators, fan actuators, humidifier actuators, desiccant actuators and the like, that are operatively controlled by the building utilization system 100 to set certain temperatures, to provide for opening and closing of blinds/curtains, to provide for more air movement, and to set certain humidity levels. The actuators 216 also include remotely actuated locks, such as door locks, to lock and unlock certain areas of the building 102 and/or offices. Speaker systems 218 are also provided, to be used for announcements, for playing music and other sounds, and so on. Hallway sections, conference rooms, break rooms, cafeterias, and the like, also include the sensors 212, the lighting 214, the actuators 216, and the speaker systems 218. Accordingly, the building utilization system 100 provides for team clustered, power efficient, and more personalized experiences via automated and more optimized control of building systems.

Figure 3:
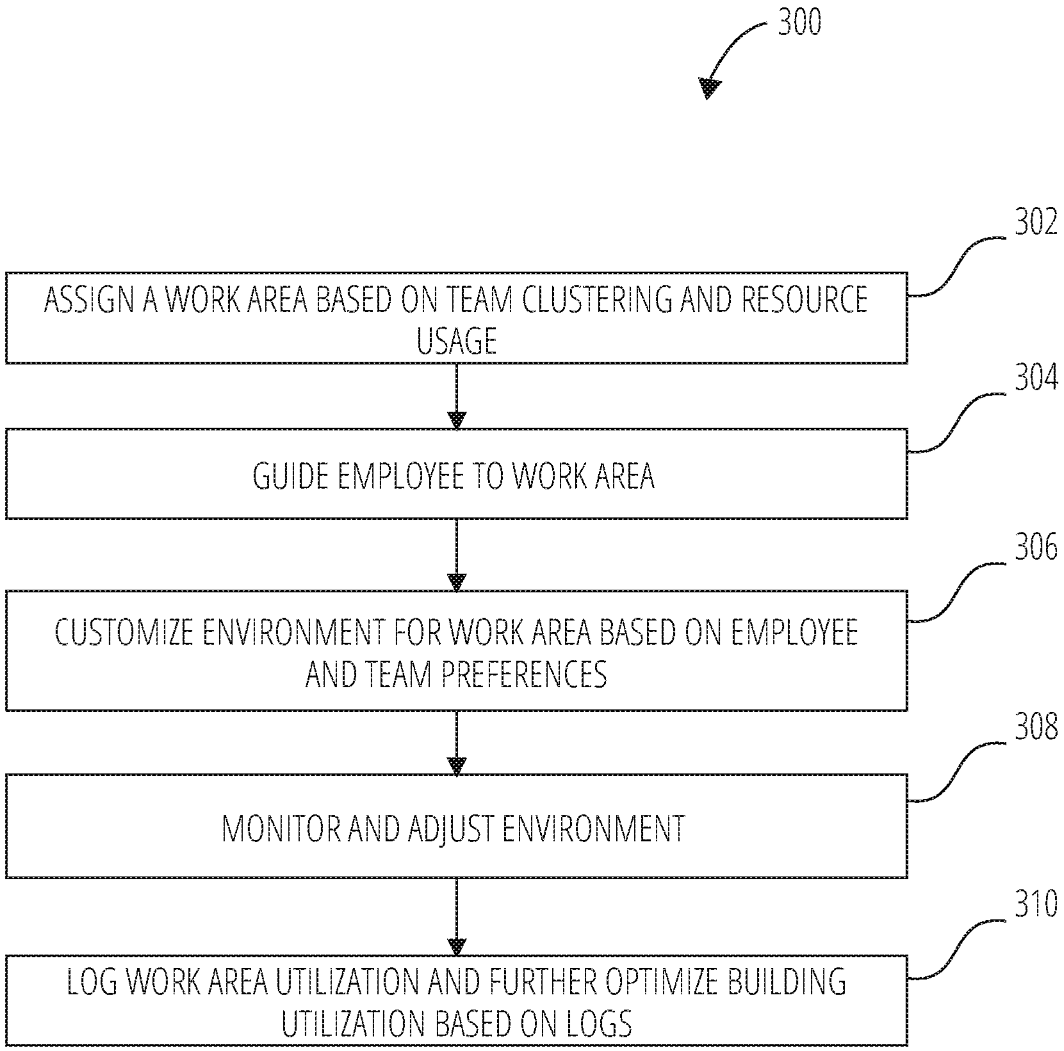
FIG. 3 is a flowchart of an example process suitable for improving on building utilization and resource use, according to certain examples.

FIG. 3 is a flowchart of an example process 300 suitable for improving on building utilization and resource use, according to certain examples. The process 300 can be performed by the building utilization system 100. In the depicted example, the process 300 assigns, at block 302, a work area to the employee 108. In certain examples, as the employee 108 approaches the building 102, the process 300 detects the employee 108 presence and identity. Based on the detected identity, the building 102 checks the employee's schedule, team membership(s), and any pre-planned activities (e.g., meetings, presentations, and the like) for the day. The process 300 then analyzes sensor system 114 data to derive current occupancy levels across the building 102. The building utilization system 100 also reviews space requirements for members of a team, past work area assignments, and previous clustering patterns for the employee 108 and their teammates. In one example, space requirements are calculated for team members that are already in the building 102 and for team members expected to arrive at the building 102 (e.g., arriving the same day that work areas are being assigned by the process 300).

Using all these inputs, the building 102 then assigns the employee 108 a work area for the day—this could be a desk, office, conference room, etc. In some examples, the work area is assigned in advance based on recurring schedule patterns. The work area assignment is derived to cluster teammates together, when possible, in a cluster such as the cluster 208. The cluster 208 is assigned by deriving a number of adjacent offices that can fit a certain number of employees 108, for example, based on team membership. There may be more than one cluster of adjacent offices that could be assigned. Resources, such as electric power usage is also taken into consideration. For example, weather exposure for the building 102 can be used to further filter the available clusters based on clusters that, for the time of the year, will use less electric power (e.g., HVAC power) due to sun exposure, newer insulation, the presence of natural light, and so on. The cluster is also assigned based to minimize travel, or example, to the garage 104, to conference rooms, and so on.

As the employee 108 enters the garage 104 and/or building 102, the process 300 then guides via a guided route, at block 304, the employee 108 to their assigned work area. More specifically, sensors (e.g., camera sensors, biometric sensors, wearable tag sensors, and so on) detect and identify the employee 108 as the employee 108 enters the garage 104 and/or the building 102. Navigation prompts are then provided, in certain examples, via lighting. For example, hallways are lit so show direction of travel, and as the employee 108 moves down a hallway, lights behind the employee 108 are dimmed or turned off. Lights can also be "blinked" and/or have their color changed to show direction of travel. Navigation prompts are also sent to the person's mobile device telling them which zone they are assigned to, directions to get there, and a map. In some examples, digital signage displays in the lobby and at elevator banks indicate work area assignments and directions as the user is sensed to be at the lobby or at the elevator bank. Audio announcements can provide orientation in lobbies and common areas. Once on the correct floor, overhead LED lighting fixtures can pulse and change color to lead the employee 108 to their desk or office. Doors are locked and unlocked as the employee 108 traverses various building sections. When the employee 108 enters the assigned work area, an audible tone can sound to confirm arrival.

In situations where more than one person will be using navigation (e.g., via lighting), the process 300 can provide each person with alternative navigation options including using mobile device apps, signage (e.g., signs with person's name directing the person to their cluster), verbal navigation (e.g., directing people by name), and so on. The process 300 can also provide navigation, for example, from various starting locations to various ending locations. That is, a person may be in an unfamiliar building and the process 300 can then provide navigation to desired locations, such as to a restroom, to a conference room, back to an assigned area, and so on.

The process 300 then customizes, at block 306, the work area. For example, a computer workstation can be turned on and personalized to have the employee's preferences, including a list of software to be used, an arrangement of desktop icons, a selection of a default printer, customization of email programs, customization of web browsers, customization of conferencing software, and so on. The process 300 also customizes the work area's temperature, humidity, lighting level, light colors, and/or sound (e.g., music) based on the employee's preferences, for example, by adjusting the lighting, actuating blinds, curtains, and/or HVAC vents, and turning on certain music. Team preferences are also taken into account. For example, certain teams prefer the use of specific software (e.g., conferencing software), have certain "do not disturb" preferences, have certain security preferences, and so on. In some examples, access to cluster can then be restricted to members of the group only by unlocking access to the cluster only to team personnel and other selected personnel (e.g., security personnel, emergency first responder personnel (e.g., firemen, police, medical personnel)) and by locking access to non-members of the team. This allows for ad-hoc security zones to be established based on real-time occupancy patterns. Notifications may be provided if an individual attempts to access an unauthorized cluster.

The process 300 then monitors, at block 308, the work area and clusters to adjust the environment. For example, sensors continuously monitor occupancy, noise levels, temperature, light levels, and other conditions in each work area and/or cluster. As people move through the space, motion sensors track their location in real-time for locking and unlocking doors. Noise sensors detect conversation levels and adjust white noise emitters to enhance privacy. Temperature sensors feed data to the HVAC system 120 to further optimize heating or cooling. Light sensors dim or brighten lighting fixtures based on changing ambient light and occupancy. When zones become unoccupied, systems go into energy conservation mode by reducing or turning off lighting, HVAC, and so on. As new occupants arrive in a work area or cluster, the environment ramps back up to comfort settings.

The process 300, at block 310, logs work area/cluster utilization and then uses the logs to further optimize building utilization and resources. For example, the occupancy sensor data is continuously logged, including counts of people in various building zones (e.g., building sections, work areas, and/or clusters). Likewise, electric power utilization data is logged. This logged utilization data is analyzed to establish usage patterns across days, weeks, and seasons. Patterns can be identified using statistical techniques, such as linear and non-linear recursion, as well as via artificial intelligence (AI) techniques, such as machine learning. The patterns help identify underutilized areas that can be reclaimed as ad-hoc collaboration spaces. The patterns also help identify areas that are using more electric power than similar areas, and are thus candidates for electric power conservation by adding new insulation, HVAC vents, upgrading HVAC systems in these areas, and so on.

The patterns identified also help ensure that frequently occupied zones have appropriate services and amenities provisioned, including IT services. Historical averages are used by the process 300 to optimize assignments, forecast demand, and improve building zone recommendations. Usage outside of scheduled hours is logged for potential space reconfiguration. The process 300 also uses access control logs to validate logged occupancy. Comparing actual occupancy to scheduled bookings flags utilization issues. The process 300 logs energy consumption and correlates the logged energy consumption to occupancy to identify energy savings opportunities. Cluster selection is also saved in logs to determine patterns of cluster use. In this manner, a higher building space utilization, improved use of building resources, and more precisely aligned services to actual demand is provided.

Figure 4:
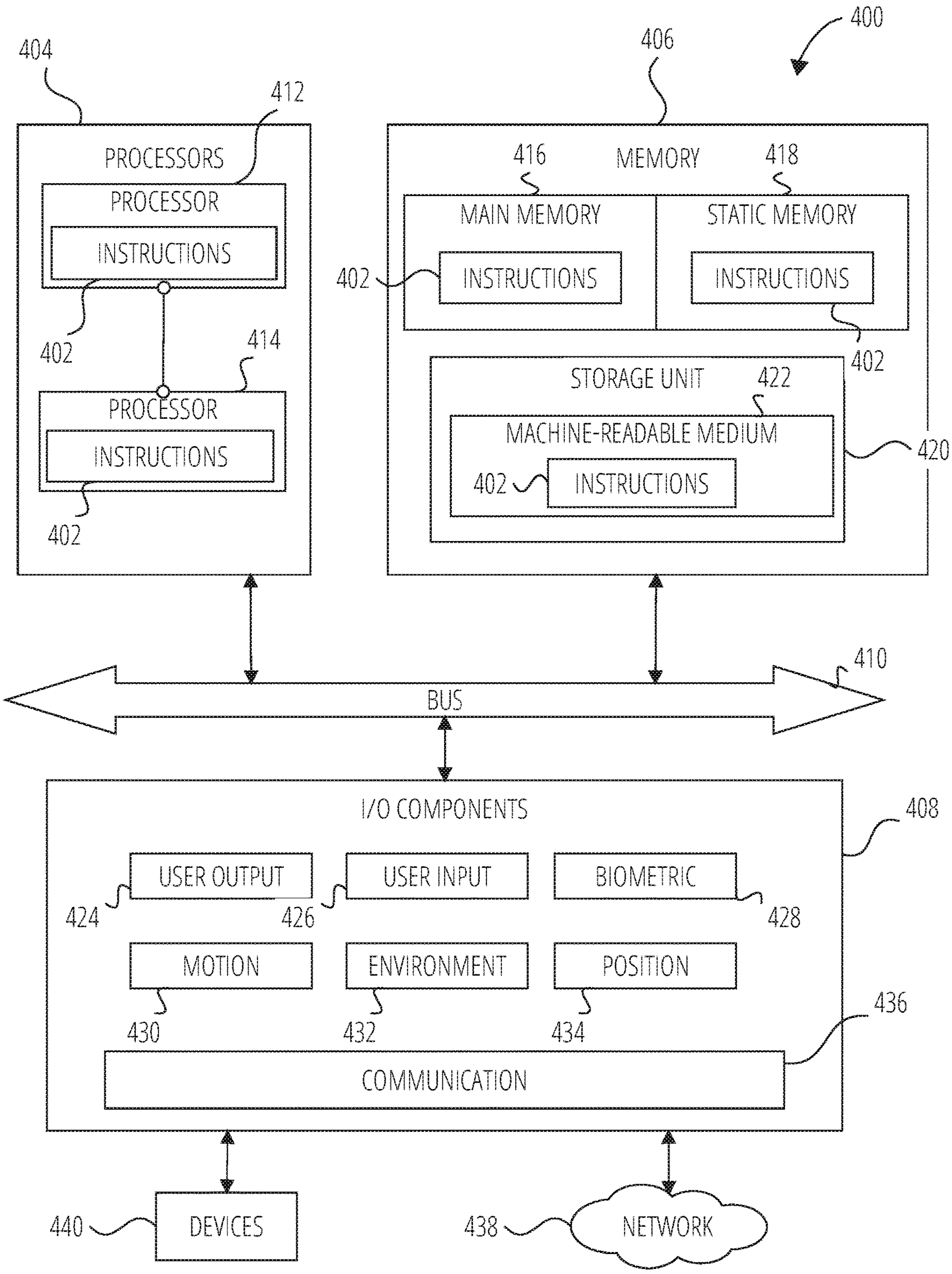
FIG. 4 is a block diagram depicting a machine suitable for executing instructions via one or more processors, in accordance with certain examples.

FIG. 4 is a diagrammatic representation of a machine 400 within which instructions 402 (e.g., software, a program, an application, an applet, an app, or other executable code) for causing the machine 400 to perform any one or more of the methodologies discussed herein may be executed. For example, the instructions 402 may cause the machine 400 to execute any one or more of the processes or methods described herein, such as the process 300. The instructions 402 transform the general, non-programmed machine 400 into a particular machine 400, e.g., the building utilization system 100, programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 402, sequentially or otherwise, that specify actions to be taken by the machine 400. Further, while a single machine 400 is illustrated, the term "machine" shall also be taken to include a collection of machines that individually or jointly execute the instructions 402 to perform any one or more of the methodologies discussed herein. In some examples, the machine 400 may also comprise both client and server systems, with certain operations of a particular method or algorithm being performed on the server-side and with certain operations of the particular method or algorithm being performed on the client-side.

The machine 400 may include processors 404, memory 406, and input/output I/O components 408, which may be configured to communicate with each other via a bus 410. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 412 and a processor 414 that execute the instructions 402. The term "processor" is intended to include multi-core processors that may comprise two or more independent processors (sometimes referred to as "cores") that may execute instructions contemporaneously. Although FIG. 4 shows multiple processors 404, the machine 400 may include a single processor with a single-core, a single processor with multiple cores (e.g., a multi-core processor), multiple processors with a single core, multiple processors with multiples cores, or any combination thereof.

The memory 406 includes a main memory 416, a static memory 418, and a storage unit 420, both accessible to the processors 404 via the bus 410. The main memory 416, the static memory 418, and storage unit 420 store the instructions 402 embodying any one or more of the methodologies or functions described herein. The instructions 402 may also reside, completely or partially, within the main memory 416, within the static memory 418, within machine-readable medium 422 within the storage unit 420, within at least one of the processors 404 (e.g., within the processor's cache memory), or any suitable combination thereof, during execution thereof by the machine 400.

The I/O components 408 may include a wide variety of components to receive input, provide output, produce output, transmit information, exchange information, capture measurements, and so on. The specific I/O components 408 that are included in a particular machine will depend on the type of machine. For example, portable machines such as mobile phones may include a touch input device or other such input mechanisms, while a headless server machine will likely not include such a touch input device. It will be appreciated that the I/O components 408 may include many other components that are not shown in FIG. 4. In various examples, the I/O components 408 may include user output components 424 and user input components 426. The user output components 424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 408 may include biometric components 428, motion components 430, environmental components 432, or position components 434, among a wide array of other components. For example, the biometric components 428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 430 include acceleration sensor components (e.g., accelerometer), gravitation sensor components, rotation sensor components (e.g., gyroscope).

The environmental components 432 include, for example, one or more cameras (with still image/photograph and video capabilities), illumination sensor components (e.g., photometer, color meters), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 434 include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 408 further include communication components 436 operable to couple the machine 400 to a network 438 or devices 440 via respective coupling or connections. For example, the communication components 436 may include a network interface component or another suitable device to interface with the network 438. In further examples, the communication components 436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 440 may be another machine or any of a wide variety of peripheral devices (e.g., a peripheral device coupled via a universal serial bus (USB) port), internet-of-things (IoT) devices, and the like.

Moreover, the communication components 436 may detect identifiers or include components operable to detect identifiers. For example, the communication components 436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 436, such as location via Internet Protocol (IP) geolocation, location via Wi-Fi® signal triangulation, location via detecting an NFC beacon signal that may indicate a particular location, and so forth.

The various memories (e.g., main memory 416, static memory 418, and memory of the processors 404) and storage unit 420 may store one or more sets of instructions and data structures (e.g., software) embodying or used by any one or more of the methodologies or functions described herein. These instructions (e.g., the instructions 402), when executed by processors 404, cause various operations to implement the disclosed examples.

The instructions 402 may be transmitted or received over the network 438, using a transmission medium, via a network interface device (e.g., a network interface component included in the communication components 436) and using any one of several well-known transfer protocols (e.g., hypertext transfer protocol (HTTP)). Similarly, the instructions 402 may be transmitted or received using a transmission medium via a coupling (e.g., a peer-to-peer coupling) to the devices 440.

The techniques described herein provide for improved building resource use and dynamic allocation of work areas.

In one example, a building utilization system includes sensors distributed throughout the building to detect a location of individuals within the building. Based on the detected location and stored affiliation data, the system assigns a work area to the individual, such as an office or conference room. The assigned work area is selected to cluster teammates together while also optimizing building resource usage. Once assigned, the environmental conditions including lighting, temperature, background noise, and music, may be customized for the individual. As teams work in collaborative zones, other areas of the building can minimize lighting, HVAC, and other systems to conserve energy. The building automation integrates access control, information security protocols, and facilities management based on real-time occupancy patterns and team member locations. Machine learning techniques may be implemented to continually improve optimization and assignment procedures. The system provides a smart building that enhances collaboration and creativity while also conserving resources.

What is claimed is:

1. A system, comprising:
- one or more sensors configured to sense location data of an individual inside of a building, entering a building, or a combination thereof;
- at least one memory storing computer instructions;
- one or more processors configured to execute the computer instructions to:
- receive, via the one or more sensors, a first sensor data indicating a work area of a first individual within a building, the work area comprising a first physical location within the building;
- receive, via the via the one or more sensors, a second sensor data indicating a second individual entering the building;
- access a first stored data from a data store indicating a team affiliation between the first individual and the second individual;
- access a second stored data from the data store a building layout for the building, wherein the building data comprises a plurality of building areas;
- receive, via the one or more sensors, a third sensor data indicating a sensed occupancy of the building, wherein the sensed occupancy comprises one or more building locations that are sensed as having one or more in-building individuals;
- calculate, based on the first physical location indicated by the one or more sensors and the plurality of building areas, a cluster area encompassing the work area of the first individual;
- assign, based on the sensed occupancy and the building layout data, a second work area to the second individual, wherein second work area is disposed within the cluster area;
- continually monitor, via the one or more sensors, a plurality of locations for a plurality of individuals entering the building; and
- assign work areas to the plurality of the individuals.

2. The system of claim 1, wherein the one or more processors are further configured to execute the computer instructions to assign work areas to the plurality of the individuals entering the building by:
- accessing a second stored data from the data store indicating the team affiliation between the first individual, the second individual, and a third individual, wherein the third individual is in the plurality of individuals; and
- assigning a third work area to the third individual, wherein the third work area is disposed within the cluster area.

3. The system of claim 1, wherein the one or more processors are further configured to execute the computer instructions to:
- detect, via the one or more sensors, a location and an identity of the second individual entering the building;
- determine a route from the detected location to the assigned second work area;
- provide a lighted path along the determined route based on controlling lighting along the determined route;
- unlock doors along the determined route to provide access to the assigned second work area;
- monitor a current location of the second individual along the determined route to the assigned second work area; and
- provide notifications to the second individual to guide the second individual along the determined route.

4. The system of claim 1, wherein the one or more processors are further configured to execute the computer instructions to calculate the cluster area by:
- determining a first set of individuals that will work in the building for a current day;
- determining a second set of individuals who are teammates with the first individual and with the second individual, wherein the second set of individuals are included in the first set of individuals;
- analyzing occupancy data for a plurality of areas in the building; and
- calculating the cluster area based on the occupancy data and the second set of individuals.

5. The system of claim 1, wherein the one or more processors are further configured to execute the computer instructions to calculate the cluster area based on using a weather prediction.

6. The system of claim 5, wherein the one or more processors are further configured to execute the computer instructions to use the weather prediction based on a sun exposure of the cluster area and a predicted reduction in electric power usage based on the sun exposure.

7. The system of claim 1, wherein the one or more processors are further configured to execute the computer instructions to unlock doors into the cluster area to members of a team that include the first individual and the second individual and to lock the doors into the cluster of work areas to non-members of the team.

8. The system of claim 3, wherein the one or more processors are further configured to execute the computer instructions to provide the lighted path along the determined route by turning on a light when the light is in front of a current position of the second individual along the determined route as the second individual travels through the building, and by turning off the light when the light is behind the current position of the individual.

9. The system of claim 1, wherein the one or more processors are further configured to execute the computer instructions to customize the assigned work area once the second individual arrives at the assigned second work area.

10. The system of claim 9, wherein the one or more processors are configured to execute the computer instructions to customize the assigned work area by setting a room temperature, setting a room humidity, actuating a blind, actuating a curtain, turning on music, or a combination thereof.

11. The system of claim 9, wherein the one or more processors are configured to execute the computer instructions to customize the assigned work area by customizing a computer disposed in the work area.

12. The system of claim 11, wherein the one or more processors are configured to execute the computer instructions to customize the computer by providing for a list of software programs in the computer to be executed by the second individual when using the computer, by customizing icons displayed on a desktop of the computer, by setting a default printer, by customizing an email client, or a combination thereof, based on user preferences of the second individual.

13. The system of claim 1, wherein the one or more processors are further configured to execute the computer instructions to continuously monitor the first individual via the one or more sensors to open and to close doors as the first individual moves through the building based on a security access granted to the first individual.

14. The system of claim 1, wherein the one or more processors are further configured to execute the computer instructions to monitor occupants of the building to adjust a heating, ventilation, and air conditioning (HVAC) system based on locations of the occupants, to adjust a lighting based on the locations of the occupants, to adjust a humidity based on the location of the occupants, to adjust noise levels based on the location of the occupants, or a combination thereof.

15. The system of claim 14, wherein the one or more processors are further configured to execute the computer instructions to save the monitoring of the occupants as building usage logs to derive usage patterns.

16. The system of claim 15, wherein the one or more processors are further configured to execute the computer instructions to analyze the usage patterns to identify underutilized areas of the building.

17. The system of claim 15, wherein the one or more processors are further configured to execute the computer instructions to analyze the usage patterns to identify areas of the building as candidates for electric power conservation.

18. The system of claim 1, wherein the one or more processors are further configured to execute the computer instructions to monitor occupants of the building to adjust a heating, ventilation, and air conditioning (HVAC) system based on locations of the occupants, to adjust a lighting based on the locations of the occupants, to adjust a humidity based on the location of the occupants, to adjust noise levels based on the location of the occupants, or a combination thereof.

19. A method, comprising:

receiving, via one or more sensors, a first sensor data indicating a work area of a first individual within a building, wherein the one or more sensors are configured to sense location data of an individual inside of a building, entering a building, or a combination thereof, and wherein the work area comprises a first physical location within the building;

receiving, via the via the one or more sensors, a second sensor data indicating a second individual entering the building;

accessing stored data from a data store indicating a team affiliation between the first individual and the second individual;

accessing a second stored data from the data store a building layout for the building, wherein the building data comprises a plurality of building areas;

receiving, via the one or more sensors, a third sensor data indicating a sensed occupancy of the building, wherein the sensed occupancy comprises one or more building locations that are sensed as having one or more in-building individuals;

calculating, based on the first physical location indicated by the one or more sensors and the plurality of building areas, a cluster area encompassing the work area of the first individual;

assigning, based on the sensed occupancy and the building layout data, a second work area to the second individual, wherein second work area is disposed within the cluster area;

continually monitoring, via the one or more sensors, a plurality of locations for a plurality of individuals entering the building; and assigning work areas to the plurality of the individuals.

20. A non-transitory machine-readable medium storing instructions that, when executed by a computer system, cause the computer system to perform operations comprising:

receiving, via one or more sensors, a first sensor data indicating a work area of a first individual within a building, wherein the one or more sensors are configured to sense location data of an individual inside of a building, entering a building, or a combination thereof, and wherein the work area comprises a first physical location within the building;

receiving, via the via the one or more sensors, a second sensor data indicating a second individual entering the building;

accessing stored data from a data store indicating a team affiliation between the first individual and the second individual;

accessing a second stored data from the data store a building layout for the building, wherein the building data comprises a plurality of building areas;

receiving, via the one or more sensors, a third sensor data indicating a sensed occupancy of the building, wherein the sensed occupancy comprises one or more building locations that are sensed as having one or more in-building individuals;

calculating, based on the first physical location indicated by the one or more sensors and the plurality of building areas, a cluster area encompassing the work area of the first individual;

assigning, based on the sensed occupancy and the building layout data, a second work area to the second individual, wherein second work area is disposed within the cluster area;

continually monitoring, via the one or more sensors, a plurality of locations for a plurality of individuals entering the building; and assigning work areas to the plurality of the individuals.

* * * * *